UNITED STATES PATENT OFFICE.

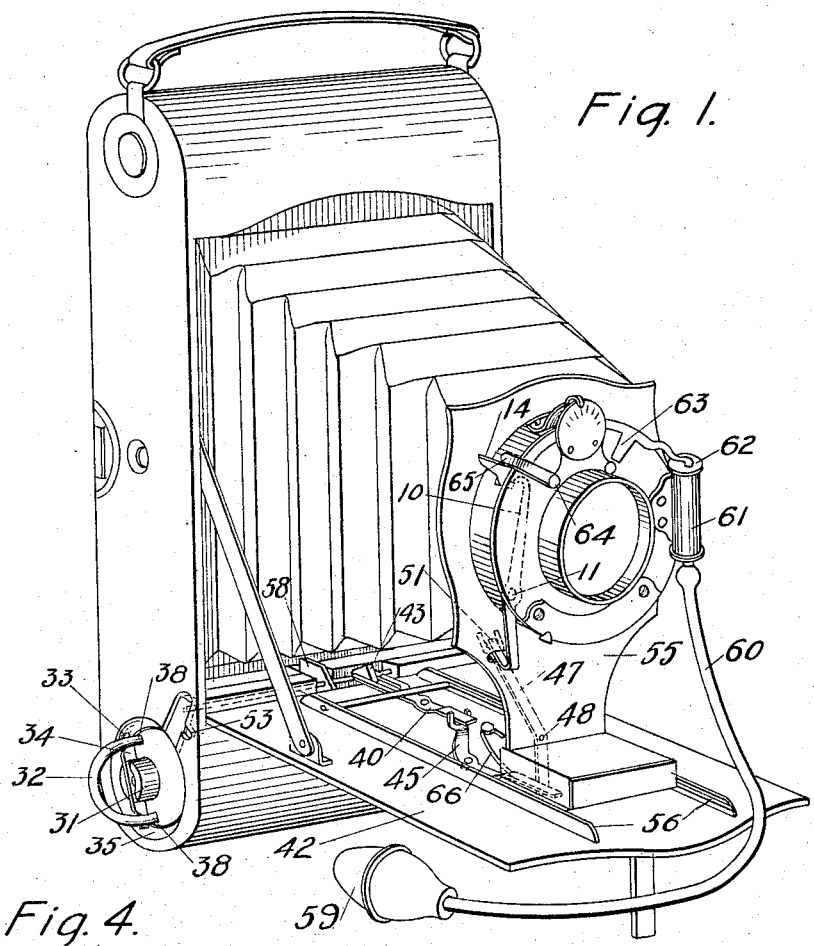
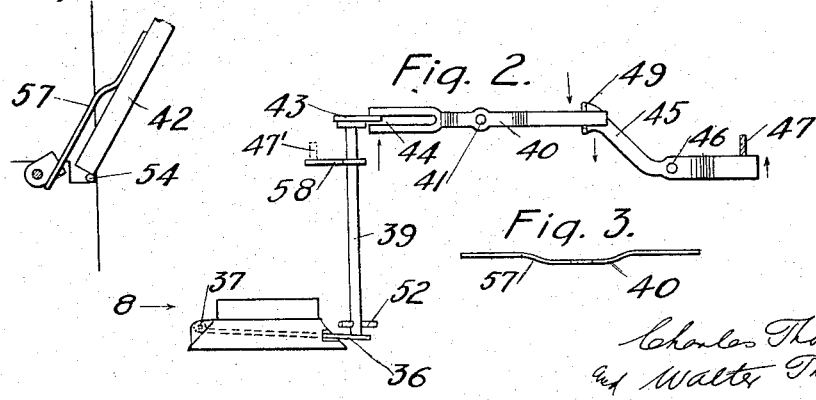

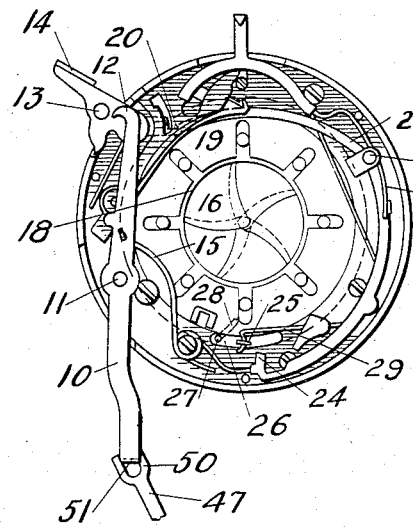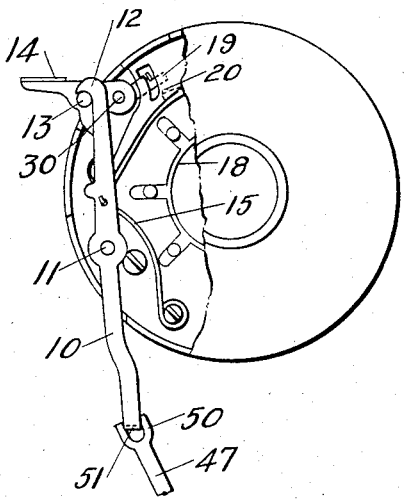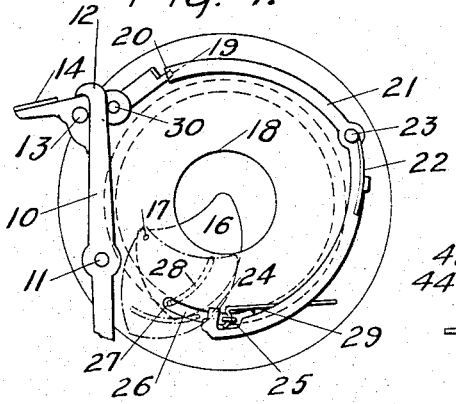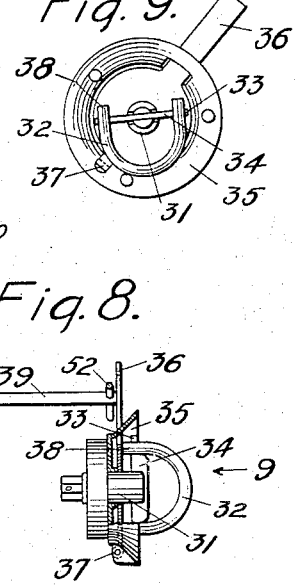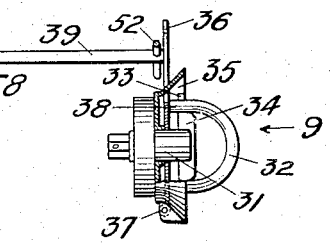

CHARLES THOMA, JR., AND WALTER THOMA, OF CARLSTADT, NEW JERSEY.

CAMERA.

1,170,364.   Specification of Letters Patent.   Patented Feb. 1, 1916.

Application filed December 4, 1912. Serial No. 734,807.

*To all whom it may concern:*

Be it known that we, CHARLES THOMA, Jr., and WALTER THOMA, citizens of the United States, and residents of Carlstadt, in the county of Bergen, and State of New Jersey, have invented certain new and useful Improvements in Cameras, of which the following is a specification.

This is a companion application to one filed on May 7, 1913, Serial No. 766,050.

The object of our invention is to lessen the possibility of making "double exposure" —in other words, to lessen or reduce to a minimum the accidental taking of more than one exposure on the same plate or piece of film. This object we accomplish by providing a controller or controlling device which acts automatically under certain conditions upon the operation of the shutter to render the shutter inoperative thereafter, and which, upon operation of the proper parts, may be rendered ineffective so as to permit further operation of the shutter.

In the preferred form of the invention the shutter and the means for positioning the plates, film or other sensitized material, are so interconnected that after one exposure the positioning means must needs be operated before the shutter can be again operated provided the operating means of the positioning means is properly positioned, as will be hereinafter set forth. In this preferred form, therefore, the means for rendering the controller ineffective are suitably connected with the positioning means so that upon operation of such positioning means the controller will be rendered ineffective so as to allow further operation of the shutter.

Various other objects and features of the invention will appear as the specification proceeds.

In the drawings accompanying the specification we have illustrated the invention in a concrete and preferred embodiment, but we would have it understood that various changes and modifications may be made therefrom without departing from the true spirit and scope of the invention.

In the drawings: Figure 1 is a perspective view illustrating the invention in a preferred form as adapted to a folding pocket camera or "kodak." Fig. 2 is a detached detail view illustrating the line of connections from the positioning means to the controller, the lever which directly connects with the controller being shown in section. Fig. 3 is a side elevation of one of the connecting levers illustrated in Fig. 2. Fig. 4 is a detail and more or less diagrammatical view illustrating how the connections fold up with the folding of the camera. Fig. 5 is a view of the shutter mechanism showing the position of the parts before the shutter has been operated. Fig. 6 is a similar view illustrating fewer details and showing the manner in which the controller interlocks with a member of the shutter mechanism after the shutter has once been operated. Fig. 7 is a detail view illustrating the operation of the shutter parts. Fig. 8 is another view of the connections between the positioning means and the shutter. This view is taken looking in the direction of the arrow 8 in Fig. 2, with certain of the parts broken away and shown in section. In this view the handle for turning the spool which carries the film has been carried from its flat inactive position to its active outstanding position. Fig. 9 is a detail view of the handle and the movable member which is positioned thereby. This view is taken looking substantially in the direction of the arrow 9 in Fig. 8, and in this view the handle is shown in its lowered inactive position.

The same reference characters refer to like parts throughout the several views.

In the form of the invention which is herein illustrated, there is provided a controller 10 which, as best shown in Figs. 5, 6 and 7, is in the form of a latch pivoted at 11 and having a hook 12 on its upper end for engagement with a stud 13 on the member 14 which forms a part of the operating mechanism for the shutter. A spring 15 or equivalent means may be provided for throwing the latch into interlocking engagement with the member of the shutter mechanism.

The shutter may be of any ordinary type and the construction of the same may of course vary to suit different cameras. The shutter illustrated is one of common construction and its method of operation will best be understood from Figs. 5 and 7. There it will be seen that the shutter proper consists of a number of segmental shutter blades 16 which are pivoted at 17 and which when in the overlapping position shown in Fig. 5, form a closure to the shutter opening 18. When the operating member 14 of the shutter is depressed from the position shown in Fig. 5 to that indicated in Fig. 7, the lug 19 on the inner end of this member finally passes from engagement with the lug 20 on the crescent-shaped arm 21, and the said arm when so released is snapped back into its lowered position by means of a spring 22. Arm 21 swings around the center 23 and during this latter movement, the hook 24 on the lower end of the arm engages with a lug 25 on the ring 26. By reason of this engagement by the hook 24 a circular movement is imparted to the ring 26, and the extent of the circular movement is limited by reason of the fact that after imparting a circular movement to the ring, the hook 24 slips off from engagement with the lug 25. During this limited rotary movement of the ring 26, pins 27 carried by the said ring act in the arcuate slots 28 formed in the shutter blades to draw the shutter blades out to the position shown in dotted lines, Fig. 7. This simultaneous outward movement of the shutter blades opens the shutter opening and an exposure is consequently made. When the hook 24 releases its hold upon the lug 25, the ring is returned to its original position by a spring or equivalent means 29, and the shutter blades are therefore returned to their closed relation. In taking time exposures the parts are so adjusted that the shutter blades will remain open, and a further operation will be necessary to cause them to close. During this operation of the shutter it will be noticed that the operating member 14 springs around its center 30 so that the stud 13 on the said member is carried below the hook on the end of the latch. The spring 15 thereupon exerts its tension to throw the latch over into the position shown in Fig. 7, so that when finally the lug 19 on the operating member frees itself from engagement with the lug 20 and the member would otherwise return to its upper operative position, it is restrained from doing so by coming into engagement with the hook of the latch, substantially as shown in Fig. 6. In this position of the operating member (Fig. 6), it will be seen that the lug 19 on the end of said member has not been lowered sufficiently to again take hold of the lug 20. Consequently any further operation of the operating member will be ineffective so far as operating the shutter is concerned.

The means for rendering the controller ineffective will now be described. In the form of camera illustrated, the sensitized material consists of a strip of film which is wound from a spool located at one side of the point of exposure on to a spool located at the other side of the position of exposure. In this type of camera, therefore, the sensitized material, here in the form of a film, is shifted with respect to the exposure opening by winding it up on the take-up spool. This take-up spool is not seen in Fig. 1 since it is inclosed within the body of the camera but the spindle for turning the same is indicated at 31. This spindle is provided with a suitable handle 32 and this handle, as is usual in cameras of this type, is pivoted at 33 upon a bar 34 connected with the spindle, so that ordinarily the handle may be folded down flat into a seat or recess 35 provided in the body of the camera to receive the same. When the film is to be shifted to present a new surface for exposure, the handle is turned from the inactive position shown in Fig. 9 into the outstanding active position shown in Figs. 1 and 8. The connections for rendering the controller ineffective in this instance consist in part of a lever 36 disposed beneath the handle and pivoted at one end at 37, so that when the handle is turned to its active position the ends 38 of the said handle will be forced into engagement with the said lever so as to depress the same from the position indicated in Fig. 2 to a position substantially as indicated in Fig. 8. This movement of the lever imparts longitudinal movement to the rod 39 which, as indicated in Fig. 1, is slidingly guided in the body of the camera, and this rod imparts movement to the inner end of a link 40 which is pivoted at 41. The connection between rod 39 and the link 40 may vary, but in order to allow for the folding movement when the foldable support 42 is folded up, a connection like that shown in Figs. 2 and 8 is preferably employed. As shown in these views, the said connection consists of a block 43 on the inner end of the rod 39 which engages in the slot 44 in the end of link 40. At its forward end, link 40 engages with a second link 45 which is pivoted at 46, and this second link engages at its forward end with a lever or releasing means 47 pivoted at 48, and engaging at its upper end with the controller. The form of connections between these various links and levers may vary, but in the illustration the link 45 is shown forked, as indicated at 49, to receive the forward end of link 40, and the lever 47 is shown with its upper end forked, as at 50, to engage with an angular lug 51 on the lower end of the controller.

The operation of the connections just described will be best understood from Figs. 1, 2 and 8. The manner in which the handle is turned from an inactive to an active position has already been described, and Fig. 8 shows very clearly how this movement of the handle presses the movable member 36 inwardly. This movement of the movable member 36 imparts a longitudinal movement to the rod 39, and the block on the end of this rod working in the slot 44 causes the inner end of link 40 to swing inward and the outer end to swing outward, as indicated by the arrows (Fig. 2.). The forward end of link 40 operating in the forked end 49 of link 46 causes the rear end of such link also to move outwardly and its forward end to move inwardly. The forward end of link 46 engaging with the lower end of lever 47 shifts the lower end of said lever inward and the upper end of the lever outward. The fork on the upper end of the lever 47 in moving outward carries with it the lower end of the controller, thereby unhooking the upper end of the controller from engagement with the stud on the member 14. The shutter is now free to be again operated.

Means are preferably provided for preventing the longitudinally movable member 39 from rotating, and such means may take the form of a guide lug 52 carried by the end of such member, which works in a guiding slot 53 formed in the body of the camera, substantially as shown in Fig. 1. The foldable support 42 which carries the shutter mechanism may be foldably connected with the body of the camera in any suitable fashion, and in the present illustration it is shown as hingedly connected therewith, as indicated at 54 in Fig. 4.

The shutter mechanism is shown as mounted on the bracket or head 55 having the extensible connection to the body of the camera as indicated by the bellows 55ª. This is the usual construction for cameras of this type and permits the camera to be folded, the head 55 movably engages between the guides 56 carried by the folding support 42. In order that the operation of shifting the film, or, in other words, positioning the sensitized material, shall have the same effect of releasing the shutter both when the camera is in the folded condition as well as in the extended position, illustrated in Fig. 1, the connections are so arranged as to be operative in either the folded or the open condition of the camera. Thus in the present instance the longitudinally movable member 39 carries an additional lug or abutment 58 so disposed that when the shutter support 55 is moved back into housed position within the camera, it will engage with the lower end of the lever 47 in the same way that the forward end of lever 45 engages with the lever 47 when the shutter support is extended. From Figs. 1 and 2 it will be clear that when the shutter support is moved back into housed position within the body of the camera, the lever 47 carried by the said shutter support moves rearwardly into a position where, as indicated at 47′ in dotted lines, Fig. 2, it lies in position to be engaged by lug 58. Therefore upon turning the handle 32 into the active position when the camera is folded, the member 39 will be shifted, as before, and the lug 58 on the said member coming into engagement with the lower end of lever 47, will shift the controller to release the same from holding engagement with the shutter mechanism. Thus upon operation of the means for positioning the sensitized material, the shutter will be released both in the folded and in the extended positions of the camera. In a camera of the rigid or nonfolding type this special provision will not have to be made.

The inner end of the pivoted link 40 may be offset, as indicated at 57 (Figs. 3 and 4) so as to remove said link from frictional engagement with the support upon which it is mounted, and this offset portion also prevents the link from interfering with the proper folding of the camera, as indicated in Fig. 4.

The shutter may be operated simply by depressing the operating member 14, or it may be operated by the well-known bulb arrangement illustrated, wherein pressure upon the bulb 59, which is connected by tube 60 with the cylinder 61, imparts movement to a piston 62 within said cylinder, and this piston acts upon one end of a lever 63 pivoted at 64, whose other end 65 engages direct with the operating member to effect the operation of the shutter.

The invention has been described heretofore as it operates in taking so-called "snap shots" or "bulb exposures", wherein only a single movement of the operating member 14 is necessary to effect both the opening and closing of the shutter. In the taking of time exposures the usual practice is to move the operating member of the shutter mechanism once to open the shutter and a second time to close the shutter. Thus in the illustration when a time exposure is to be made, assuming the parts to be set for a time exposure, the bulb is pressed once to operate member 14 to open the shutter, and it is then, after the proper time of exposure, pressed a second time to again operate member 14 so as to close the shutter.

A special feature of this invention consists in the arranging of the automatic control so that it will permit this double movement of the operating member when taking time exposures, and will interlock with the shutter mechanism after the said second operation, to prevent any further movement of the shutter. It will be noted that the operation of the controller when it engages with the operating member of the shutter mechanism, is to prevent the full upward return movement of such operating member. In Fig. 5 the full return position of the operating member 14 is illustrated, and Fig. 6 shows how the controlling latch engages with said member to prevent it from returning all the way to its upper position. The hook member 12 of the controller latch, therefore, when in the position shown in Fig. 6, permits the operating member 14 to be shifted downward but prevents said member from returning upward to the position shown in Fig. 5. In the taking of a time exposure the operating member 14 moves from the position indicated in Fig. 5 down past the position indicated in Fig. 7, which movement, through suitable connections, only certain of which are shown, serves to open the shutter. The controller 10 then swings over into the position shown in Fig. 7 so that as the operating member moves upward after this opening movement of the shutter, it is engaged and held by the controller, as in Fig. 6. The member 14 is now depressed a second time, to effect the closing of the shutter. This second or closing movement of the operating member is lesser in extent than the first or "shutter opening" movement of this member. The hook 12 on the controller is therefore disposed at such a point that it will permit the member 14 to have a movement sufficient to close the shutter. In the making of the time exposure, therefore, the operating member is moved from the extreme upward position shown in Fig. 5 to the extreme lower position (past that shown in Fig. 7), thereby effecting the opening of the shutter. The controller is thereupon shifted over into the position shown in Fig. 7 so that as the controlling member moves upward, in an attempt to resume its initial position, it is arrested by the latch, as indicated in Fig. 6. The controlling member is now operated a second time, and the movement permitted by the latch is sufficient to effect the closing of the shutter. But the extent of upward movement permitted by the hook 12 on the controller latch is not sufficient to permit the operating member 14 to regain control of the shutter for the purpose of opening the same; consequently the controller must be released before the next exposure can be made. A spring 66 or like means is preferably employed for holding the lever 36 in the outward position shown in Fig. 2, in readiness to be acted upon by the handle 32.

What is claimed, is:

1. In a camera, the combination with a shutter and a film-winding spool, of a controller arranged upon operation of the shutter to automatically engage with the shutter mechanism to prevent a second operation of the shutter, a handle for the film-winding spool, normally lying in an inactive position, a movable member disposed to be engaged and shifted by the spool handle when the same is moved to an active position, and connections from the movable member adapted when said member is shifted by the spool handle, to shift the controller to an ineffective position.

2. In a folding camera, the combination of a foldable support connected with the body of the camera, shutter mechanism adapted at times to be supported by the support, a controller located adjacent to the shutter mechanism and arranged upon actuation of the shutter to interlock with the shutter mechanism to prevent further operation of the shutter, means in the body of the camera for positioning the sensitized material with respect to the shutter, and a train of operating levers between the positioning means and the controller and supported on said foldable support adapted upon operation of the positioning means to operate to disconnect the controller from engagement with the shutter mechanism.

3. In a camera, the combination of a film-winding spool, a handle for turning the same, arranged normally to lie in an inactive position and movable into an active position, a pivoted lever arranged to be depressed by the handle when the same is moved to an active position, a shutter and mechanism for operating the same, a pivoted latch arranged upon actuation of the shutter to interlock with a member of the shutter mechanism to prevent further operation of the shutter, and connections from the pivoted lever to the latch, whereby upon shifting of the lever by the handle the pivoted latch will be shifted from engagement with the member of the shutter mechanism.

4. In a camera, a spindle for connection with the spool which carries the film, a handle pivoted to the spindle so that it may be turned from an inactive position lying flat against the camera into an active outstanding position, a pivoted lever disposed beneath the handle and arranged in the turning of the handle to an active position to be shifted thereby, a shutter and mechanism for operating the same, a pivoted latch arranged upon actuation of the shutter by the shutter mechanism to interlock with a member of the shutter mechanism to prevent further operation of the shutter, a member adapted to be shifted longitudinally by the pivoted lever, and lever connections from the said member to the pivoted latch.

5. In a folding camera, the combination with means for positioning the sensitized material, of a folding shutter support, shutter mechanism adapted at times to be supported by said support, a controller arranged upon operation of the shutter to engage with the shutter mechanism to prevent operation of the shutter thereafter, and pivoted levers carried on said folding support within the camera for providing connections between the positioning means and the controller in both the extended and the folded position of the camera whereby upon operation of the positioning means the controller will be rendered ineffective.

6. In a folding camera, the combination with means for positioning the sensitized material, a folding shutter support, shutter mechanism adapted at times to be supported by said support, a controller arranged upon operation of the shutter to engage with the shutter mechanism to prevent operation of the shutter thereafter, means directly operated from said positioning means, means providing a connection between said directly operated means and the controller to operate the latter when the camera is extended to render the controller ineffective upon the operation of the positioning means, and another means to operate the controller upon operation of the positioning means to render the same ineffective when the camera is folded.

7. In a folding camera, the combination with means for positioning the sensitized material, a folding shutter support, shutter mechanism adapted at times to be supported by said support, a controller arranged upon the operation of the shutter to engage with the shutter mechanism to prevent operation of the shutter thereafter, a member adapted to be operated from said positioning means, and means pivoted on said folding support and forming a connection between said member and said controller, whereby upon operation of the positioning means the controller will be rendered ineffective.

8. In a folding camera, the combination with means for positioning the sensitized material, a folding shutter support, shutter mechanism adapted at times to be supported by said support, a controller arranged upon the operation of the shutter to engage with the shutter mechanism to prevent operation of the shutter thereafter, a member adapted to be operated by the positioning means, levers mounted on said folding support connecting said member and controller for operating said controller when the camera is extended to render the same ineffective, and means on said member to operate said controller to render the same ineffective, when the camera is folded, upon operation and the positioning means.

9. In a folding camera, the combination with means for positioning the sensitized material, of a folding shutter support, a shutter and mechanism to operate the same adapted at times to be supported on said support, means to prevent a further operation of the shutter after an operation of the same, means mounted on said folding support and providing a connection between said positioning means and the shutter controlling means to render the latter ineffective upon operation of the positioning means when the camera is extended, and a folding connection between said connecting means and the positioning means to allow the support to be folded without rendering the said connection ineffective.

Signed at New York, in the county of New York and State of New York this 27th day of November, A. D. 1912.

CHARLES THOMA, JR.
WALTER THOMA.

Witnesses:
LAURA E. SMITH,
PHILIP S. McLEAN.

Copies of this patent may be obtained for five cents each, by addressing the "Commissioner of Patents, Washington, D. C."